United States Patent
Ye

(10) Patent No.: US 8,387,937 B2
(45) Date of Patent: Mar. 5, 2013

(54) STAND

(75) Inventor: Zhen-Xing Ye, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 142 days.

(21) Appl. No.: 12/752,142

(22) Filed: Apr. 1, 2010

(65) Prior Publication Data

US 2011/0114814 A1 May 19, 2011

(30) Foreign Application Priority Data

Nov. 13, 2009 (CN) .......................... 2009 1 0309720

(51) Int. Cl.
*A47B 97/04* (2006.01)

(52) U.S. Cl. ..................... 248/454; 248/922; 248/346.01

(58) Field of Classification Search ............ 248/346.01, 248/346.03, 346.07, 127, 146, 917–923, 248/450, 455, 456, 460, 462, 370

See application file for complete search history.

(56) References Cited

U.S. PATENT DOCUMENTS

| | | | | |
|---|---|---|---|---|
| 1,869,278 A | * | 7/1932 | Ramelli | 248/455 |
| 4,116,413 A | * | 9/1978 | Andersen | 248/451 |
| 4,421,318 A | * | 12/1983 | Sverdlik et al. | 473/476 |
| 4,421,943 A | * | 12/1983 | Withjack | 136/246 |
| 5,622,348 A | * | 4/1997 | Stechly | 248/371 |
| 5,668,570 A | * | 9/1997 | Ditzik | 345/173 |
| 6,464,195 B1 | * | 10/2002 | Hildebrandt | 248/460 |
| 6,700,775 B1 | * | 3/2004 | Chuang et al. | 361/679.01 |
| 7,780,131 B2 | * | 8/2010 | Oh | 248/276.1 |

* cited by examiner

*Primary Examiner* — Terrell McKinnon
*Assistant Examiner* — Steven Marsh
(74) *Attorney, Agent, or Firm* — Altis Law Group, Inc.

(57) ABSTRACT

A stand includes a supporting panel, two first rotating members attached to opposite sides of the supporting panel, two second rotating members rotatably mounted to first ends of the first rotating members, and two supporting members mounted to second ends of the first rotating members to support the two first rotating members. An angle forms between the first and second rotating members at the first ends, because of the supporting member.

19 Claims, 4 Drawing Sheets

STAND

BACKGROUND

1. Technical Field

The present disclosure generally relates to support stands and, particularly, to a stand to support a notebook computer.

2. Description of Related Art

Due to small size and light weight, notebook computers are easy to carry and use in a variety of occasions. However, people feel uncomfortable in using a notebook computer, especially when no appropriate place (for example when they are on the bed or outdoors) to support the notebook computer is available.

DETAILED DESCRIPTION

Figure 1:
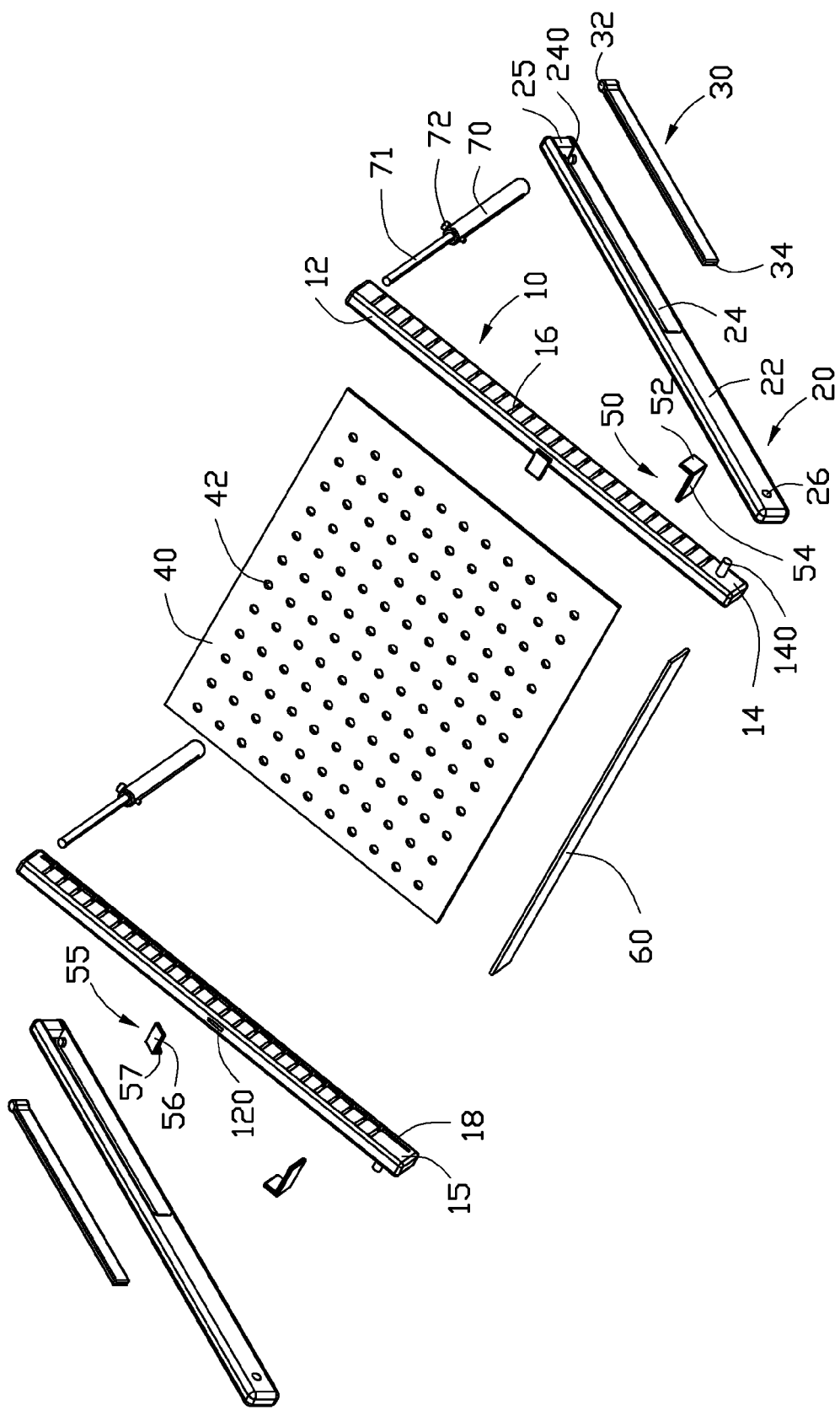
FIG. 1 is an exploded, isometric view of an exemplary embodiment of a stand.

Referring to FIG. 1, an exemplary embodiment of a stand includes a supporting panel 40, two first rotating members 10, two second rotating members 20, two carrying members 30, two blocking members 50, two positioning members 55, a connecting member 60, and two supporting members 70.

The supporting panel 40 is rectangular, and defines a plurality of vents 42 for heat dissipation.

Each first rotating member 10 is a long, rectangular post. The first rotating member 10 includes a top wall 12, a first sidewall 14 and a second sidewall 15 opposite to the first sidewall 14, perpendicularly extending from two opposite sides of the top wall 12. A plurality of fastening holes 16 is defined in the first rotating member 10, along a longitudinal direction of the first rotating member 10, and through the first sidewall 14 and the second sidewall 15. The top wall 12 defines a fastening hole 120 in a center of the top wall 12. A post 140 perpendicularly extends from the first sidewall 14, adjacent to a first end of the first rotating member 10. The second sidewall 15 longitudinally defines a sliding slot 18, adjacent to a bottom wall of the first rotating member 10 opposite to the top wall 12. The first rotating member 10 defines a screw hole (not shown) in the bottom wall (not shown), adjacent to a second end of the first rotating member 10 opposite to the first end. The connecting member 60 is generally a lath. Two first rotating members 10 are connected with each other by the connecting member 60, forming a U-shaped frame.

Each second rotating member 20 is a long, rectangular post. The second rotating members 20 each include two opposite sidewalls 22. The second rotating members 20 each define an opening 24 through the sidewalls 22. The second rotating members 20 each define a pivot hole 26 in a first end thereof, through the sidewalls 22. Two posts 240 extend from a top wall and a bottom wall bounding each opening 24, adjacent to a second end of each second rotating member 20 opposite to the first end. A positioning block 25 extends from a lateral sidewall bounding each opening 24, adjacent to the second end of the second rotating members 20 and between the posts 240.

Each carrying member 30 is a rectangular post capable of being received in the opening 24. A top wall and a lower wall of the carrying member 30 each define a pivot hole 32, corresponding to the posts 240 of the second rotating members 20.

Each blocking member 50 is generally L-shaped. The blocking members 50 each include a fixing tab 52 and a blocking tab 54 perpendicularly extending from one end of the fixing tab 52.

Each positioning member 55 is generally L-shaped. The positioning members 55 each include a positioning tab 56 and a connecting tab 57 perpendicularly extending from one end of the positioning tab 56.

Each supporting member 70 includes a retractable shaft 71, and an adjusting button 72 to adjust a length of the shaft 71. A distal end of the shaft 71 forms a threaded portion (not shown). The adjusting button 72 extends through the shaft 71, to resist against a retractable portion of the shaft 71 to position the retractable portion.

Figure 2:
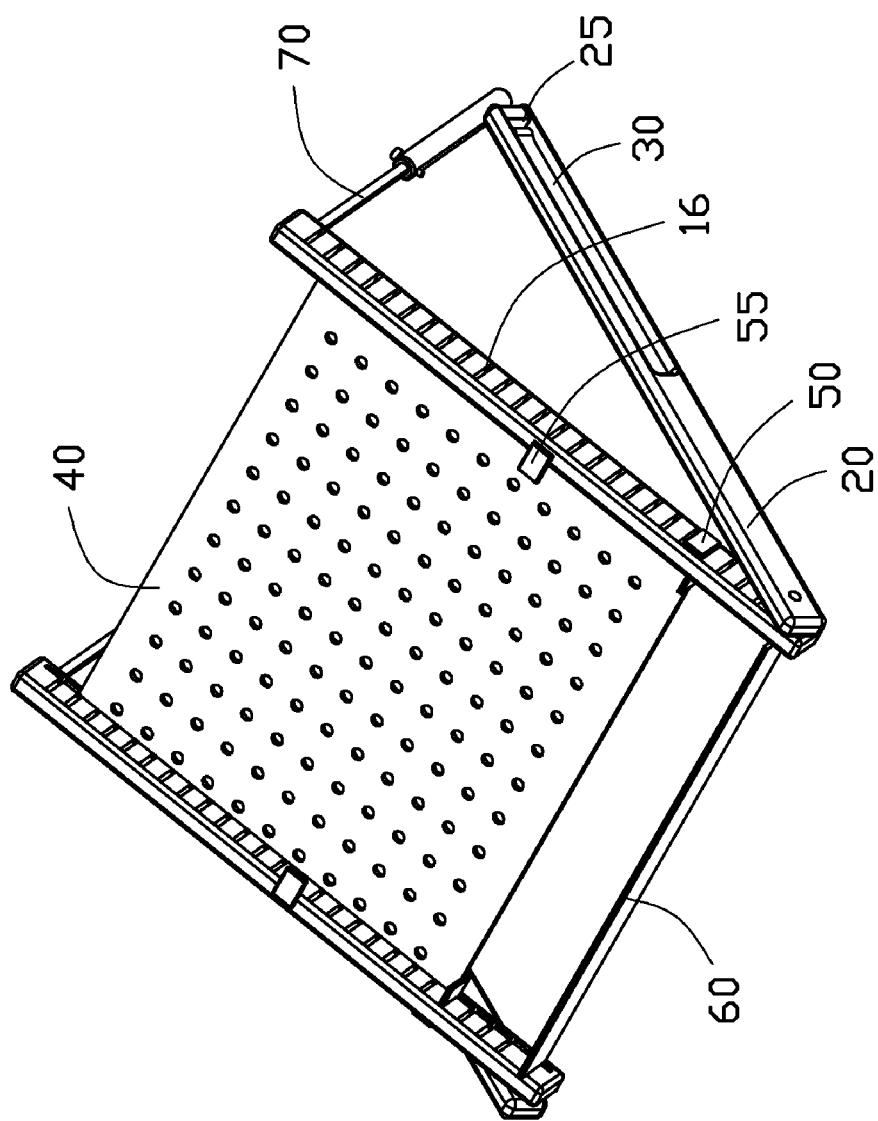
FIG. 2 is an assembled, isometric view of the stand of FIG. 1.

Referring to FIG. 2, in assembly, the first rotating members 10 attaches to opposite sides of the supporting panel 40, with the sides of the supporting panel 40 slidably received in the sliding slots 18. The carry members 30 are received in the openings 24 of the second rotating members 20. The posts 240 rotatably engage in the pivot holes 32. The posts 140 rotatably engage in the pivot holes 26, rotatably connecting the first rotating members 10 to the second rotating member 20. The connecting tabs 57 of the positioning members 55 are inserted into the fastening holes 120 of the first rotating members 10, to fix the positioning members 55 to the first rotating members 10. The blocking tabs 54 of the blocking members 50 extend through two corresponding fastening holes 16 of the two first rotating members 10, to block a bottom of the supporting panel 40. The fixing tabs 52 of the blocking members 50 resist against the first sidewalls 14 of the first rotating members 10. The threaded portion of the two shafts 71 engage in the screw holes of the first rotating members 10, to fix the supporting members 70 to the first rotating members 10.

Figure 3:
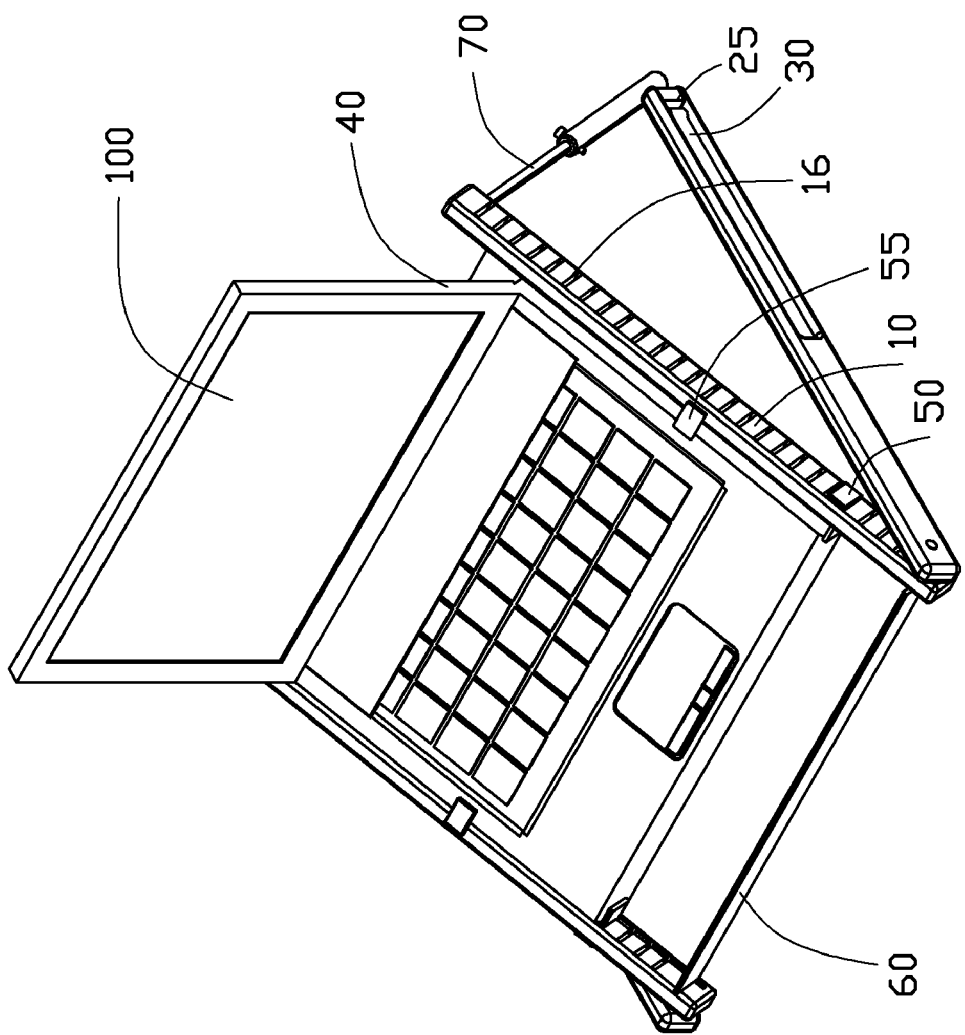
FIG. 3 is an isometric view of the stand of FIG. 2 in a use state.

Referring to the FIG. 3, in use of the stand, a portable device, such as notebook computer 100, is placed on the supporting panel 40. The length of two supporting members 70 is adjusted via operation of the adjusting button 72, to change the angle between the second rotating members 20 and the first rotating members 10, to adjust an used angle of the notebook computer 100. The supporting panel 40 slides along the sliding slots 18, to adjust the used height of the notebook computer 100. The blocking tabs 54 of the blocking members 50 resist against a front side of the notebook computer 100, the positioning tabs 56 of the positioning members 55 resist against a top of the notebook computer 100.

Figure 4:
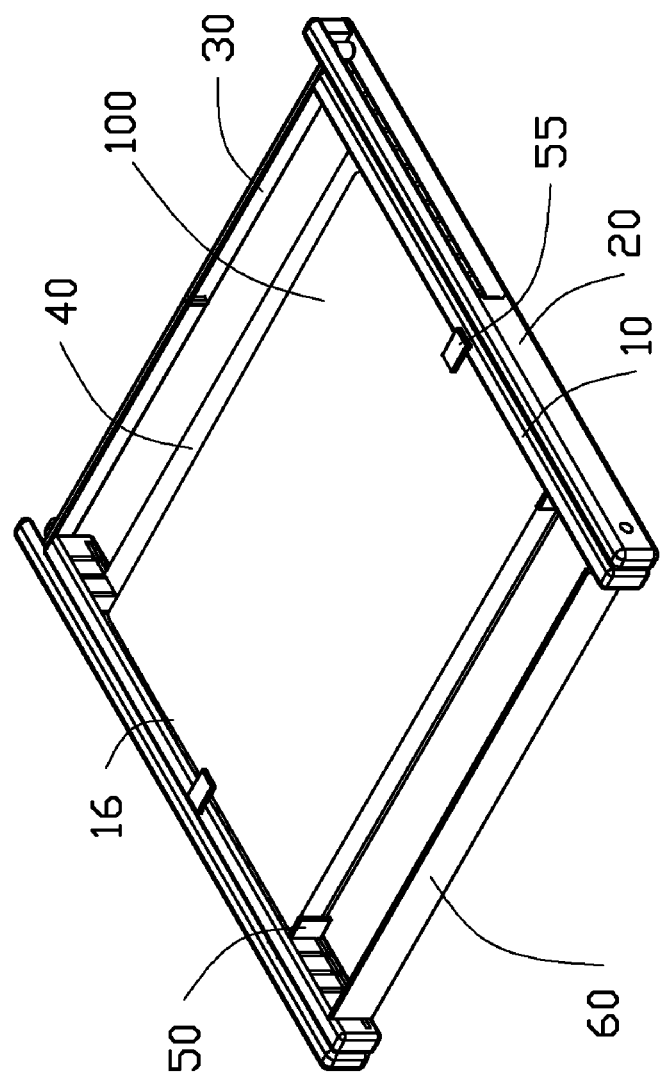
FIG. 4 is similar to FIG. 3, but showing a different state.

Referring to FIG. 4, in another use of the stand, the two supporting members 70 are disassembled from the first rotating members 10. The carrying members 30 rotate towards each other to align and contact with each other. The first rotating members 10 rotate to be parallel with the second rotating members 20. The blocking tabs 54 resist against the front side of the notebook 100, the positioning tabs 56 resist against the top of the notebook 100. Therefore, it is very easy to carry the notebook computer 100 by carrying the carrying members 30. In the process of carrying the carrying members 30, the positioning blocks 25 position the carrying members 30.

In other embodiments, two first rotating members 10 and the connecting member 60 can be integrally formed.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A stand comprising:
a supporting panel;
two first rotating members each comprising a first side and a second side opposite to the first side, the first sides of the first rotating members attached to opposite sides of the supporting panel;
two second rotating members, wherein first ends of the second rotating members rotatably connect to the second sides of the first rotating members, at first ends of the first rotating members; and
two supporting members mounted to second ends of the first rotating members opposite to the first ends, thereby providing an angle between each first rotating member and the corresponding second rotating member at the first ends of the first and second rotating members, wherein each supporting member comprises a retractable shaft mounted to the first rotating member, a length of the shaft is adjustable to adjust the angle between the first and second rotating members.

2. The stand of claim 1, further comprising two blocking members mounted to the corresponding first rotating members, wherein each blocking member comprises a blocking tab exposing through the first side of the corresponding first rotating member.

3. The stand of claim 2, wherein each first rotating member defines a plurality of fastening holes along a longitudinal direction, each blocking member further comprises a fixing tab perpendicularly extending from an end of the blocking tab, to selectively fix in one of the plurality of fastening holes.

4. The stand of claim 1, further comprising two positioning members mounted to the corresponding first rotating members, wherein each first rotating member further comprises a top wall connected to a top of the first side, each positioning member comprises a positioning tab departing from and parallel to the top wall of the corresponding first rotating member, the positioning tab extending out of the first side.

5. The stand of claim 4, wherein each first rotating member further comprises a top wall connected between tops of the first and second sides, the top wall defines a fastening hole, each positioning member further comprise a connecting tab perpendicularly extending from an end of the positioning tab, to fix in the fastening hole.

6. The stand of claim 1, wherein a post extends from the second sidewall of each first rotating member at the first end, each second rotating member correspondingly defines a pivot hole in the first end, to rotatably engage with the post.

7. The stand of claim 1, further comprising two carry members, wherein each second rotating member longitudinally defines an opening adjacent to a second end of the second rotating member opposite to the first end, to receive a corresponding carry member, wherein the carry members are rotatably mounted to sidewalls bounding the openings, the carry members are operable to extend out of the openings towards each other.

8. The stand of claim 7, wherein two posts extend from a top sidewall and a bottom sidewall bounding the opening, adjacent to the second end of the second rotating member a top wall and a bottom wall of each carrying member each define a pivot hole to rotatably engage the corresponding post.

9. The stand of claim 8, wherein defines a positioning block extends from a lateral sidewall bounding the opening adjacent to the second end of the second rotating member and between the posts, to position the extended carrying members.

10. The stand of claim 1, further comprising a connecting member connected between the first ends of the first rotating members.

11. The stand of claim 1, wherein the first side of the first rotating member defines a sliding slot, to slidably receive a corresponding side of the supporting panel.

12. A stand comprising:
a supporting panel;
two first rotating members each comprising a first side and a second side opposite to the first side, the first sides of the first rotating members attached to opposite sides of the supporting panel, wherein each first rotating member defines a plurality of fastening holes along a longitudinal direction, each blocking member further comprises a fixing tab perpendicularly extending from an end of the blocking tab, to selectively fix in one of the plurality of fastening holes;
two second rotating members, wherein first ends of the second rotating members rotatably connect to the second sides of the first rotating members, at first ends of the first rotating members; and
two carrying members rotatably mounted to second ends of the second rotating members opposite to the first ends, wherein a rotation axis of the second rotating members about the first rotating members is perpendicular to a rotation axis of the carrying members about the second rotating members, each second rotating member longitudinally defines an opening adjacent to a second end of the second rotating member opposite to the first end, to receive a corresponding carry member, wherein the carry members are rotatably mounted to sidewalls bounding the openings, the carry members are operable to extend out of the openings towards each other.

13. The stand of claim 12, further comprising two blocking members mounted to the corresponding first rotating members, wherein each blocking member comprises a blocking tab exposing through the first side of the corresponding first rotating member.

14. The stand of claim 13, wherein each first rotating member defines a plurality of fastening holes along a longitudinal direction, each blocking member further comprises a fixing tab perpendicularly extending from an end of the blocking tab, to selectively fix in one of the plurality of fastening holes.

15. The stand of claim 12, further comprising two positioning members mounted to the corresponding first rotating members, wherein each first rotating member further comprises a top wall connected to a top of the first side, each positioning member comprises a positioning tab departing from and parallel to the top wall of the corresponding first rotating member, the positioning tab extending out of the first side.

16. The stand of claim 15, wherein each first rotating member further comprises a top wall connected between tops of the first and second sides, the top wall defines a fastening hole, each positioning member further comprise a connecting tab perpendicularly extending from an end of the positioning tab, to fix in the fastening hole.

17. The stand of claim 12, wherein a positioning block extends from a lateral sidewall bounding the opening adjacent to the second end of the second rotating member, to position the extended carrying members.

18. The stand of claim 12, wherein the first side of the first rotating member defines a sliding slot, to slidably receive a corresponding side of the supporting panel.

19. A stand comprising:
- a supporting panel;
- two first rotating members each comprising a first side and a second side opposite to the first side, the first sides of the first rotating members attached to opposite sides of the supporting panel;
- two second rotating members, wherein first ends of the second rotating members rotatably connect to the second sides of the first rotating members, at first ends of the first rotating members;
- two supporting members mounted to second ends of the first rotating members opposite to the first ends, thereby providing an angle between each first rotating member and the corresponding second rotating member at the first ends of the first and second rotating members; and
- two carry members, each second rotating member longitudinally defines an opening adjacent to a second end of the second rotating member opposite to the first end, to receive a corresponding carry member, wherein the carry members are rotatably mounted to sidewalls bounding the openings, the carry members are operable to extend out of the openings towards each other.

\* \* \* \* \*